United States Patent
Bottom

(10) Patent No.: US 7,017,366 B2
(45) Date of Patent: Mar. 28, 2006

(54) RETAIL BANANA STORAGE UNIT

(75) Inventor: Kenneth H. Bottom, Cincinnati, OH (US)

(73) Assignee: Thermal Technologies, Inc., Blythwood, SC (US)

( * ) Notice: Subject to any disclaimer, the term of this patent is extended or adjusted under 35 U.S.C. 154(b) by 0 days.

(21) Appl. No.: 10/051,927

(22) Filed: Jan. 22, 2002

(65) Prior Publication Data

US 2004/0144124 A1    Jul. 29, 2004

(51) Int. Cl.
F25D 17/04    (2006.01)
(52) U.S. Cl. .......................... 62/407; 62/411
(58) Field of Classification Search ........... 62/407, 62/426, 62, 404, 405, 411, 414, 415, 429; 312/236, 349; 211/85.4; 426/106
See application file for complete search history.

(56) References Cited

U.S. PATENT DOCUMENTS

| | | | |
|---|---|---|---|
| 4,736,592 A * | 4/1988 | Ohling .......................... 62/62 |
| 5,028,443 A * | 7/1991 | Wade .......................... 426/312 |
| 5,228,313 A * | 7/1993 | Okamoto et al. ............. 62/407 |
| 5,312,034 A * | 5/1994 | Nakagawa et al. ......... 229/120 |
| 5,671,609 A * | 9/1997 | Lionetti ........................ 62/407 |
| 6,615,908 B1 * | 9/2003 | Bosher et al. ............. 165/48.1 |

* cited by examiner

Primary Examiner—Mohammad M. Ali
(74) Attorney, Agent, or Firm—Robert B. Famiglio; Famiglio & Associates

(57) ABSTRACT

A storage apparatus for boxes containing fruit includes a cabinet having side walls, a rear wall, front wall portions, and a cover portion. The front wall portions together define an access opening for insertion and withdrawal of a stack of the boxes. Each of the side walls include an outer wall and an inner wall separated from the outer wall by a space, and a plurality of vertically oriented partitions disposed between the inner and outer walls where the partitions are spaced from one another and are in intimate contact with the inner and outer side walls. In this way, the inner and outer side walls define, with the partitions, airflow channels. The cover portion is positioned atop the front, side and rear walls, and supports blowers disposed atop the airflow channels of each side wall and conduit means interconnecting the blowers and the channels for fluidly communicating said blowers with said air flow channels. The cover portion further houses an evaporator coil, an air-conditioning apparatus, and ducting communicating the interior of the cabinet with the interior of the cover portion. Each of the inner walls include a plurality of apertures, with each of the apertures being associated with a unique one of the air flow channels to allow the air in that channel to impact boxes of fruit located adjacent that aperture. Motors located in the cover portion drive the fans to cause circulation of the conditioned air through the cabinet and then back to the cover portion.

14 Claims, 3 Drawing Sheets

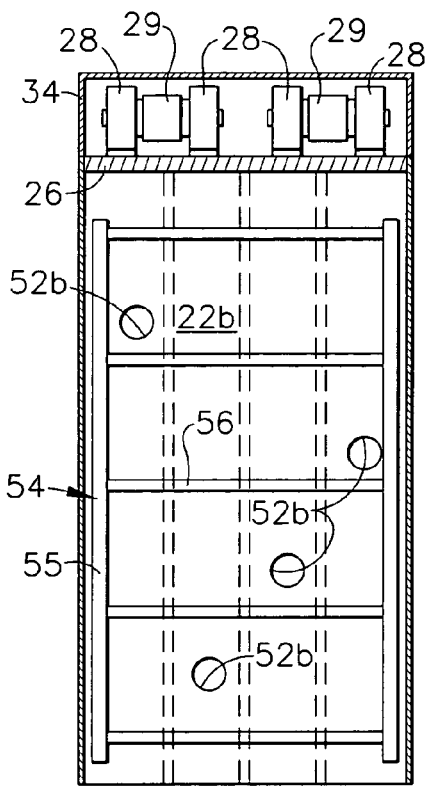
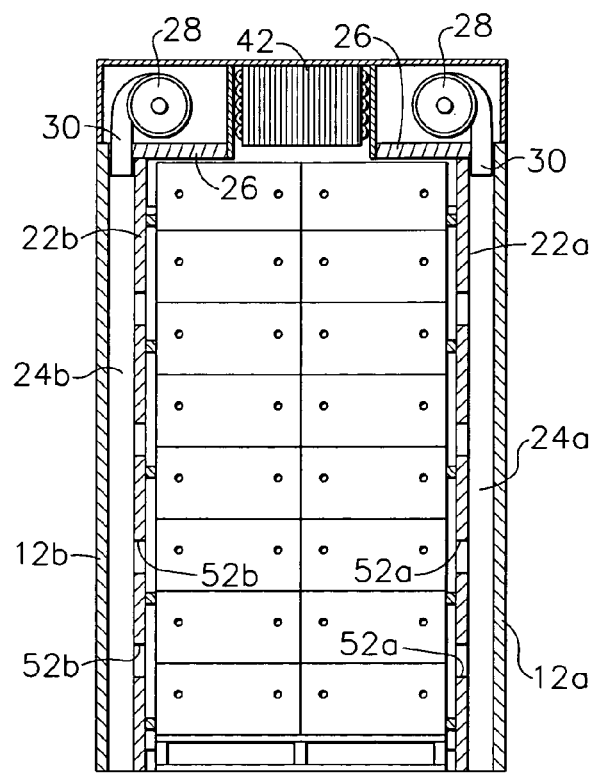
FIG. 4   FIG. 5
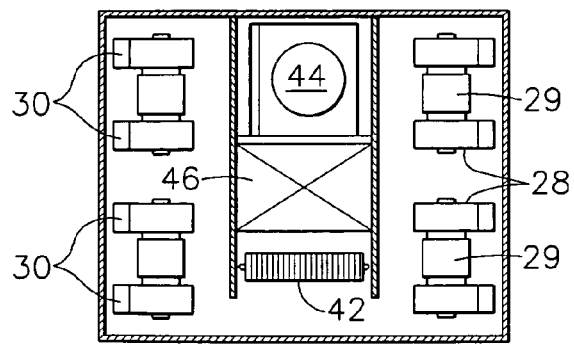
FIG. 6

RETAIL BANANA STORAGE UNIT

FIELD OF THE INVENTION

The present invention relates to banana storage apparatus, and more particularly to a banana storage apparatus including air distribution, cooling and heating devices to facilitate the storage of ripe bananas in a retail grocery store.

BACKGROUND OF THE INVENTION

Typically, fruit is shipped to supermarkets in boxes, generally six boxes to a layer and from one to eight layers tall. In a typical situation, the boxes are opened and re-stacked to allow air circulation around the fruit to remove heat that builds up within tightly bunched, closed, boxes.

Banana boxes used for packaging and shipping fruit by all growers or shippers are designed very similarly, and all contain openings on all six sides of the box to allow air circulation and an escape path for the built-up heat.

In a warehouse facility, bananas arrive in refrigerated shipping containers or trailers. The fruit is palletized, generally in six boxes to a layer, eight layers tall, so that there are forty-eight boxes to a pallet and approximately twenty pallets in a full shipment. As the fruit is stacked about eighty-two (82) inches high on the pallets, each pallet is provided with banding which is wrapped about the boxes stacked on the pallets to prevent the boxes from shifting or falling during transport.

Before being shipped for retail sale at the consumer level, all bananas go through a ripening process in specially designed "ripening rooms". In these rooms, fruit is generally placed in the same banded 48 box pallet as they are shipped in. In this banded stable stack, the aforementioned air holes in adjacent boxes are aligned and air is forced to move about the stack of boxes, flowing freely from one box to another through the aligned holes in the sides, top and bottom of the boxes. Thereafter, the air escapes to a common return where it is cooled and then caused to be recirculated, over and over, through and about the stack of boxes.

After the fruit is ripened, it is ready for shipment to the retail or end user location. A full banded pallet of fruit contains forty-eight (48) boxes each weighing forty (40) pounds (each pallet therefore carries about 1920 pounds). Very few supermarkets order bananas in such large quantities, so pallets are unloaded into smaller quantities for shipment. At this point, the banding must be removed, and thereafter, the boxes sitting on the pallets or in the stack are no longer pressed tightly together, and the holes in the boxes are no longer aligned.

Upon arrival at a retail location, good storage practices dictate that the banana boxes be re-stacked, with the lids removed, in a loose arrangement so heat in the boxes can escape. If this is not done, the quality of the fruit and the shelf-life is adversely affected. But even if done correctly, an average order of 25 boxes takes about 30 minutes to re-stack, and requires a clerk to lift each box 2 to 3 times. This adds up to 2000 to 3000 pounds of lifting.

Further it is known that the ripening time of fruit can be controlled by removing the fruit from the boxes and letting it stand in ambient or cooled air. However, this technique has been found less than desirable insofar as too much time is required to remove the fruit. Moreover, the fruit typically becomes bruised in this process and is rendered unattractive to the purchasing consumer.

It would therefore be desirable to have an apparatus which would permit ripening or storage of fruit contained in boxes stacked on a pallet after the banding, normally wrapped about the boxes when stacked on the pallet, has been removed.

Interest in keeping fruit fresh for as long as possible before presentation and/or sale to consumers has a long history, and fruit ripeners of varying kinds are well known in the art.

For example, U.S. Pat. No. 5,028,443 to Wade discloses a method and apparatus for controlling the ripening of fresh fruit in which a stack of boxes of fruit is wrapped or covered with plastic such that the vertical faces of the boxes are covered. The boxes in the stack have holes in upper and lower faces which register with corresponding holes in vertically adjacent boxes to facilitate a vertical movement of an air-ethylene mixture through the stack. A lid on top of the stack of boxes is provided with a blower and an air-conditioning unit, and a hose or other conduit fluidly couples the top and bottom of the stack.

The blower draws air vertically through the stack, while the air-conditioning unit maintains the conditioned air in the stack at a predetermined temperature and humidity.

The fruit ripening apparatus of Wade is nevertheless not able to do the job where the fruit is being stored in the retail store just prior to display and sale to the consumer. As a rule, the equipment involved is complex, costly to maintain, and requires substantial space to house the equipment.

There is therefore a great and long-felt need for a fruit ripening apparatus which permits storage and/or ripening of fruit while the fruit boxes are stacked on a pallet, and which is light weight, not cumbersome in construction, unbreakable, easy to erect and store, inexpensive and simple in design.

In one aspect of the present invention, bananas are stored in stacks of unbanded boxes in a cabinet having channels in walls through which air is forced via fans to access openings in the cabinet walls adjacent selected ones of the boxes in the cabinet so that heat, that builds up in the boxes as the bananas ripen, can be removed before creating an injurious environment for the ripening bananas.

In another aspect of the invention, a fruit ripening apparatus comprises a cabinet having side walls and a cover portion within which are housed a fans and motors for driving the fans, the side walls having channels defined therein which fluidly communicate with the fans, so that fruit stored in the cabinet in stacks of boxes from which banding has been removed can be immersed in a cooling environment.

Other aspects, advantages and features of the invention will become more apparent and better understood, as will equivalent structures which are intended to be covered herein, with the teaching of the principles of the invention in connection with the disclosure of the preferred embodiments thereof in the specification, claims and drawings.

BRIEF DESCRIPTION OF THE DRAWINGS

FIG. 4 is a cross-sectional view of the fruit ripening apparatus shown in FIG. 1 and taken along section lines A—A in FIG. 3;

FIG. 5 is a cross-sectional view of the fruit ripening apparatus shown in FIG. 1 and taken along section lines B—B in FIG. 2; and FIG. 6 is a cross-sectional view of the fruit ripening apparatus shown in FIG. 1 and taken along section lines C—C in FIG. 3.

DETAILED DESCRIPTION OF THE PREFERRED EMBODIMENT

Figure 2:
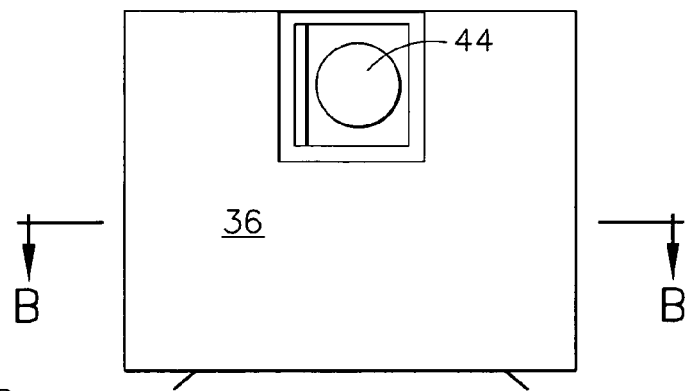
FIG. 2 is a top view of the fruit ripening apparatus shown in FIG. 1.
Figure 3:
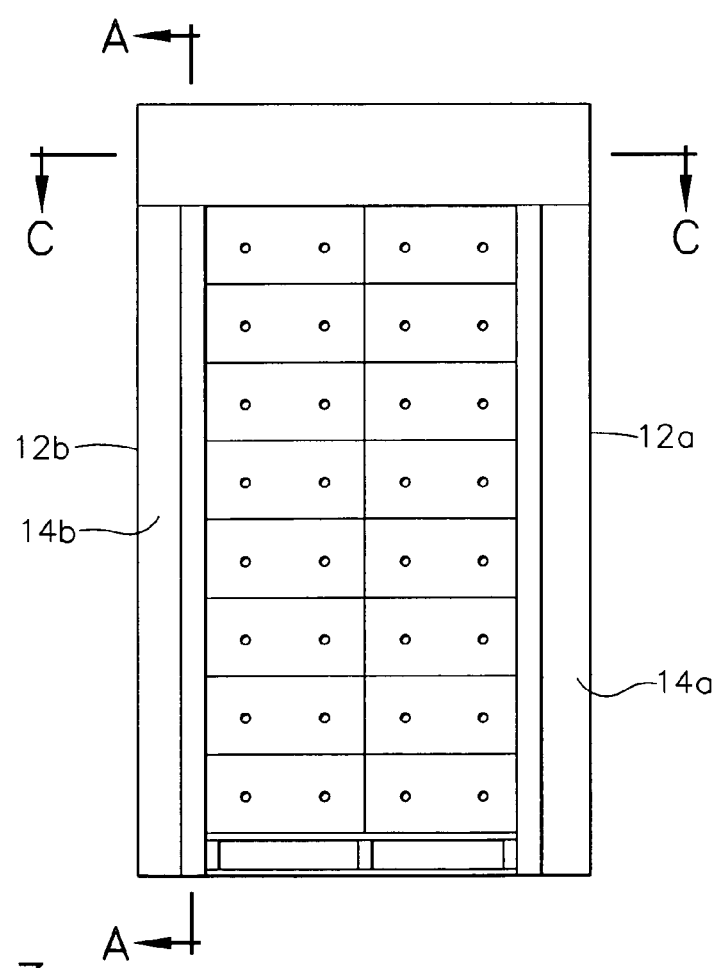
FIG. 3 is a front view of the fruit ripening apparatus shown in FIG. 1.

Referring now to the various Figures, there is shown a fruit ripening or storage apparatus 10 which comprises a lower housing component 10a and an upper housing component 10b. The lower housing component includes "exterior" wall elements, including side walls 12a, 12b, front walls 14a, 14b, and a rear wall 16 directly opposite the front walls (see FIG. 2). The side walls, front walls and rear wall may be separate panels or elements, or they may all be formed from the same sheet bent at appropriate locations to form walls that are disposed at right angles to one another. Each front wall terminates in a narrow guide portion 18a, 18b, which is disposed at an angle to the plane defined by the front walls, preferably at an acute angle to the front walls. The guide portions 18a, 18b are angled away from one another and together define an opening which has a dimension extending between the front walls that is wide enough to receive a pallet P on which are stacked a plurality of fruit-containing boxes. The upper component includes a top section 18 securable to the uppermost regions of the front and side walls. A floor panel or wall may optionally be provided, but it is contemplated that the apparatus 10 will be erected at a retail store, perhaps in a room outside of the area where shoppers frequent, and the floor of the store will suffice nicely as the floor of the apparatus. The interior of the apparatus 10 defines substantially rectangular areas in vertical and horizontal planes in order to accommodate multiple boxes of the fruit in each row; however, the present invention contemplates any shape of the interior of which the walls and top section of the apparatus might be formed include metal, a metallic material, a plastic, a paper, a composite material, or some combination of the aforesaid materials.

A second set of "interior" side walls 22a, 22b are provided within the apparatus 10 (see FIG. 5). The "interior" side walls are disposed parallel to the "exterior" side walls 12a, 12b, and are spaced inwardly therefrom. Partitions 62 (note that these are shown in phantom in FIG. 4) are arranged normal to the "interior" and "exterior" walls to define, with these walls, channels 24a, 24b through which air may be circulated. Through openings 52a, 52b are provided in each "interior" side wall 22a, 22b at different staggered locations along the lateral extent of the "interior" side walls 22a, 22b, and at different, unique, locations along the vertical extent of the "interior" side walls. The through openings communicate the various channels with the interior of the apparatus 10. A framework of flexible seal elements 54 comprising vertical elements 55 and horizontal elements 56 is secured to each "interior" side wall (only one framework is shown in FIG. 4). The framework 54 of seal elements is provided for the purpose of maintaining the sides of the boxes, which have been placed in the apparatus 10, at a predetermined distance (based on the thickness of the sealing elements) spaced from the inner surface of the "interior" walls.

The channels formed by the partitions disposed normal to, and between, the "exterior" side walls 12a, 12b and the "interior" side walls 22a, 22b function as air delivery channels. Each of the air delivery channels fluidly communicates the output of the fan 28 with the openings 52a, 52b located in the "interior" side walls. With the seal framework maintaining the boxes spaced from the inner surface of the adjacent "interior" side wall, air forced by each fan 28 through the respective channel 62 and out through a respective opening 52a, 52b can then immerse the stack of boxes in a bath of cool air, while also allowing passage of the cool air into the interior of these boxes through the holes provided in the sides of the boxes.

Each of the fans or blowers 28 are mounted to an upper wall or ceiling 26 that extends across and separates the upper portion 10b from the lower portion 10a of the apparatus 10. Each of the fans, or each of a pair of adjacent fans, are powered by a motor 29. Ducting 30 fluidly couples the fans 28 with a respective one of the channels 52a, 52b.

Figure 1:
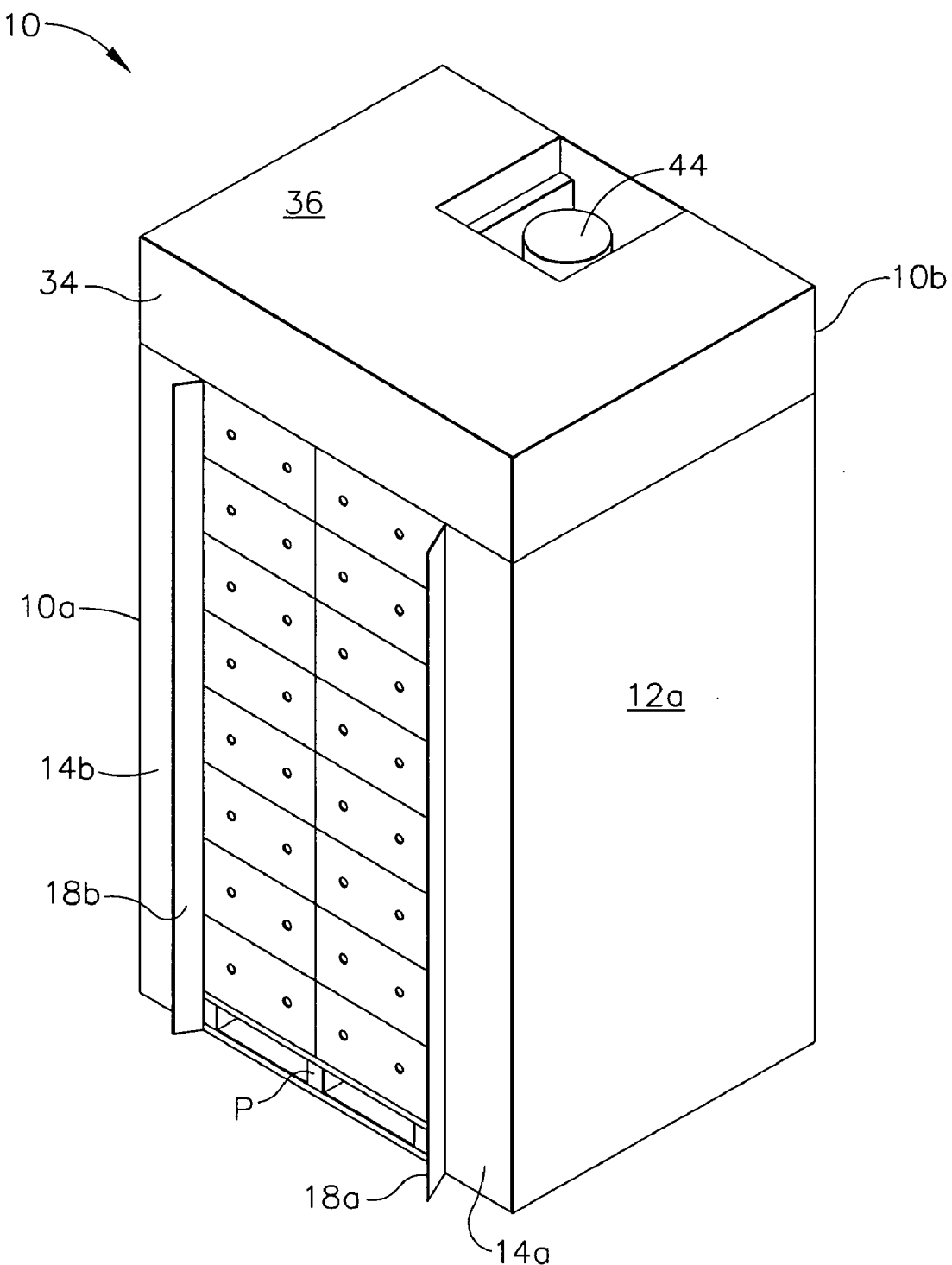
FIG. 1 is a perspective view of a fruit ripening apparatus in accordance with the teachings of the present invention.

The upper portion 10b of the housing includes a lid or cover 32 having side walls 34 and a ceiling 36 (note FIG. 1). The height of the side walls of the cover are chosen sufficiently large enough to permit containment of the blowers therein, as well as an evaporator coil 42 and an air conditioning unit 44. A return air duct 46 also communicates the volume defined within the cover 32 with the interior volume of the lower portion of the apparatus 10.

It is to be recalled that, for purposes of this invention, the boxes are stacked atop each other within the apparatus 10 with the banding removed. With this understanding, it is to be recognized that the boxes will deform slightly so that spaces exist between adjacent boxes, both in a lateral orientation and in a vertical orientation, and further between the boxes and the interior side walls of the apparatus. Thus, air directed into the interior of the apparatus through the channels 52a, 52b will pass around the exterior of the boxes as well as through the boxes via the openings in the sides of the boxes before being redirected back to the fans at the upper portion 10b of the apparatus.

The invention also contemplates the use of a curtain attached to the apparatus at the upper extent of the opening between the front walls. The curtain will be rolled up and secured to allow access to the interior of the apparatus for the purpose of removing one or more boxes of produce from the apparatus, and when it is desired to close the apparatus once more, the curtain will be released and allowed to drape down over the opening. It is contemplated that the curtain will be made of a plastic material, preferably in sheet form, and desirably transparent.

In one version of the invention, the apparatus is designed for use in a cooled storage area typical of most modern supermarkets, the rooms are typically kept at temperatures in the range of from about 55° F. to about 60° F. This is a good storage temperature for bananas as well as other products that need to be cooled. In this environment, the apparatus does not include a cooling unit or a means of closing off the entry opening between the front walls. Air is forced through the boxes for one pass and then flows into the open room.

In another version of the invention, the apparatus is designed for use in supermarkets that do not have air conditioned areas and where temperatures encountered are more extreme. Here, the apparatus 10 is equipped with a cooling and heating unit, and an entrance closure in the form of a door or curtain. The apparatus of this version is provided with a return air opening at the top of the chamber in which the boxes are stored, preferably in the vicinity of the evaporator coil 42 and air conditioning unit 44. This enables the air that is forced through the channels 24a, 24b, and around and through the stacked boxes, to re-enter the compartment in which the fans 28 are located so that it can be circulated past or though the coil 42 and cooled by the air conditioning unit 44.

It will be apparent that the invention is not limited to the embodiments described above and that variations and modifications may be made thereto within the scope of the invention.

I claim:

1. A storage apparatus for boxes containing fruit, comprising:
   a cabinet including side walls, a rear wall, front walls, and a cover portion, said cabinet having an interior volume of a size sufficient to house a stack of said boxes;
   said front walls of said cabinet defining an access opening for insertion and withdrawal of one or more of said boxes;
   each of said side walls of said cabinet comprising an outer wall, an inner wall separated from said outer wall by a space, and a plurality of vertically oriented partitions disposed between said inner and outer walls, said partitions being spaced from one another and being in intimate contact with said inner and outer side walls, so that said inner and outer side walls define, with said partitions, air flow channels; and
   said cover portion being positioned atop the front, side and rear walls, said cover portion housing blowers disposed atop the air flow channels of each side wall and conduit means interconnecting said blowers and said channels for fluidly communicating said blowers with said air flow channels.

2. The storage apparatus of claim 1, wherein said cover portion further houses a condenser coil and air-conditioning apparatus.

3. The storage apparatus of claim 1, wherein said inner walls each include a plurality of apertures, each of said apertures being associated with a unique one of said air flow channels to allow the air in that channel to impact boxes of fruit located adjacent that aperture.

4. The storage apparatus of claim 3, wherein said apertures are arranged at horizontally staggered positions.

5. The storage apparatus of claim 1, wherein said cabinet includes a return for directing air emanating from the apertures in said inner wall of said cabinet to the cover portion.

6. The storage apparatus of claim 1, wherein said cover portion further includes at least one motor for driving said fans.

7. The storage apparatus of claim 6, wherein each fan is driven by a separate motor.

8. The storage apparatus of claim 6, wherein each pair of fans is driven by a separate motor.

9. The storage apparatus of claim 1, wherein said front walls include narrow edge wall portions disposed at an acute angle to said front walls, said narrow edge wall portions forming a guide to facilitate insertion and withdrawal of said stack of boxes.

10. The storage apparatus of claim 1, and further including a closure carried by the cabinet to block egress of air from the interior of said cabinet.

11. The storage apparatus of claim 10, wherein said closure comprises at least one sheet of plastic material.

12. The storage apparatus of claim 10, wherein said closure is attached to said cabinet between said front wall portions.

13. A storage apparatus for boxes containing fruit, comprising:
   a cabinet including side walls, a rear wall, front walls, and a cover portion, said cabinet having an interior volume of a size sufficient to house a stack of said boxes;
   said front walls of said cabinet defining an access opening for insertion and withdrawal of one or more of said boxes;
   each of said side walls of said cabinet comprising an outer wall, an inner wall separated from said outer wall by a space, and a plurality of vertically oriented partitions disposed between said inner and outer walls, said partitions being spaced from one another and being in intimate contact with said inner and outer side walls, so that said inner and outer side walls define, with said partitions, at least two separate air flow channels which are isolated from each other and which provide for air flow independently to each level of said stacked boxes; and
   said cover portion being positioned atop the front, side and rear walls, said cover portion housing blowers disposed atop the air flow channels of each side wall and conduit means interconnecting said blowers and said channels for fluidly communicating said blowers with said air flow channels.

14. A storage apparatus for stacked boxes containing fruit, comprising:
   a chamber having a volume defined by a floor, ceiling, and sidewalls including an access opening for insertion and withdrawal of one or more of said boxes;
   alignment structure within the chamber for spacing stored product apart from the sidewall, the stored product having a height comprised of stacked boxes;
   at least two substantially airtight volumes defined by a sidewall and a second interior wall substantially parallel to said sidewall, each said sidewall and second interior wall extending along the height of the stored product to define a pressurized volume; and
   a source of air operably connected to the chamber for circulating fluid through the stacked boxes by blowing said air into said pressurized volume and for withdrawing the fluid from another side of the stored product thereby creating a substantially closed air flow path to and from the said source of air;
   wherein further each said pressurized volume is further divided internally into at least two separate pressurized volumes isolated from each other and each communicating with the output of said source of air whereby each internal pressurized volume provided air flow to a separate level of the stacked boxes.

* * * * *